(12) United States Patent
Fahldieck et al.

(10) Patent No.: US 10,501,270 B2
(45) Date of Patent: Dec. 10, 2019

(54) DRIVE SYSTEM FOR A CONTAINER CONVEYING SECTION, AND CONTAINER CONVEYING SECTION COMPRISING A DRIVE SYSTEM OF SAID TYPE

(71) Applicant: KHS GmbH, Dortmund (DE)

(72) Inventors: Andreas Fahldieck, Idar-Oberstein (DE); Ludwig Clüsserath, Bad Kreuznach (DE)

(73) Assignee: KHS GmbH, Dortmund (DE)

( * ) Notice: Subject to any disclaimer, the term of this patent is extended or adjusted under 35 U.S.C. 154(b) by 0 days.

(21) Appl. No.: 15/774,821

(22) PCT Filed: Nov. 18, 2016

(86) PCT No.: PCT/EP2016/078134
§ 371 (c)(1),
(2) Date: May 9, 2018

(87) PCT Pub. No.: WO2017/089238
PCT Pub. Date: Jun. 1, 2017

(65) Prior Publication Data
US 2018/0327197 A1 Nov. 15, 2018

(30) Foreign Application Priority Data
Nov. 26, 2015 (DE) .................. 10 2015 120 540

(51) Int. Cl.
*B65G 47/86* (2006.01)

(52) U.S. Cl.
CPC .... *B65G 47/847* (2013.01); *B65G 2201/0247* (2013.01)

(58) Field of Classification Search
CPC ....... B65G 47/847; F16H 13/00; F16H 19/00; F16H 13/06; B66C 7/14
USPC .......... 198/805, 803.3, 803.6, 803.4, 470.01, 198/478.01
See application file for complete search history.

(56) References Cited

U.S. PATENT DOCUMENTS

| 1,047,288 | A | 12/1912 | Radack |
| 2,500,465 | A | 3/1950 | Meyer |
| 3,683,799 | A | 8/1972 | Szpitalak |
| 8,733,541 | B2 * | 5/2014 | van de Loecht ....... B65G 54/02 198/805 |
| 8,844,708 | B2 * | 9/2014 | Winter ...................... B65C 9/16 198/470.1 |

(Continued)

FOREIGN PATENT DOCUMENTS

| DE | 103 703 | 2/1974 | |
| DE | 10 2013 014 618 | 3/2015 | |
| EP | 1232974 A1 * | 8/2002 | ............. B65G 23/18 |

(Continued)

*Primary Examiner* — Gene O Crawford
*Assistant Examiner* — Lester III Rushin
(74) *Attorney, Agent, or Firm* — Occhiuti & Rohlicek LLP

(57) ABSTRACT

A container-conveying segment includes a driving conveyor and a driven conveyor that couple to each other at a handoff area at which containers are transferred from one to the other. The conveyors comprise star wheels that rotate in opposite directions about their respective vertical machine axes. The rotors interact with one another at the handoff area. A drive couples to the driving conveyor but not to the driven conveyor. The driving conveyor transfers torque to the driven conveyor at a torque-transfer area.

20 Claims, 10 Drawing Sheets

(56) References Cited

U.S. PATENT DOCUMENTS 9,073,695 B2 * 7/2015 Lukes .................... B65G 17/32

FOREIGN PATENT DOCUMENTS

| FR | 2 109 824 | 5/1972 |
|----|-----------|--------|
| GB | 1 560 361 | 2/1980 |
| JP | H04 358 625 | 12/1992 |
| WO | WO2015/032463 | 3/2015 |

* cited by examiner

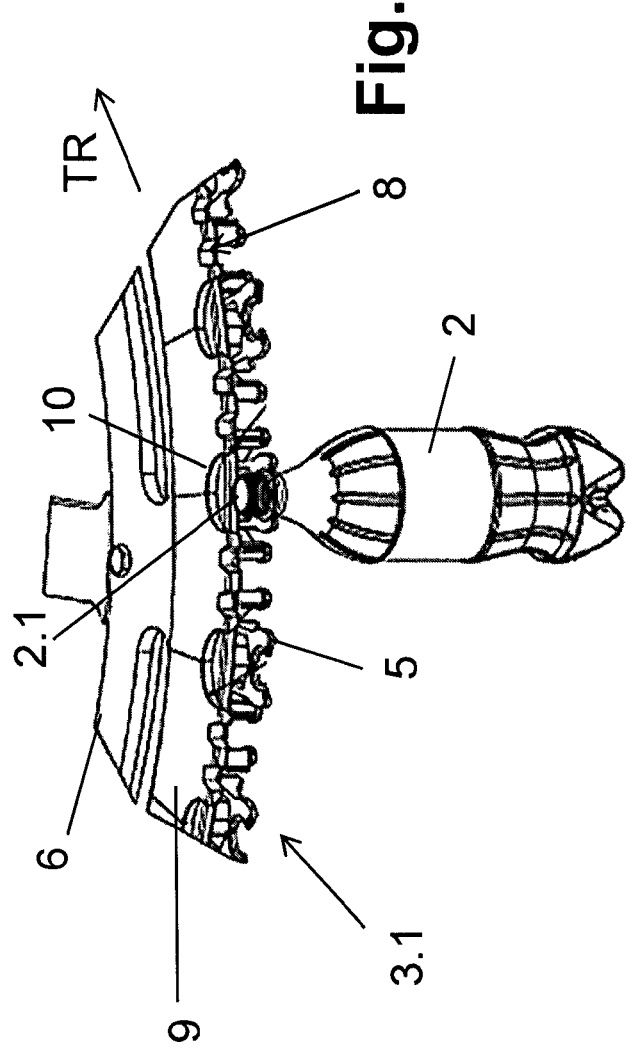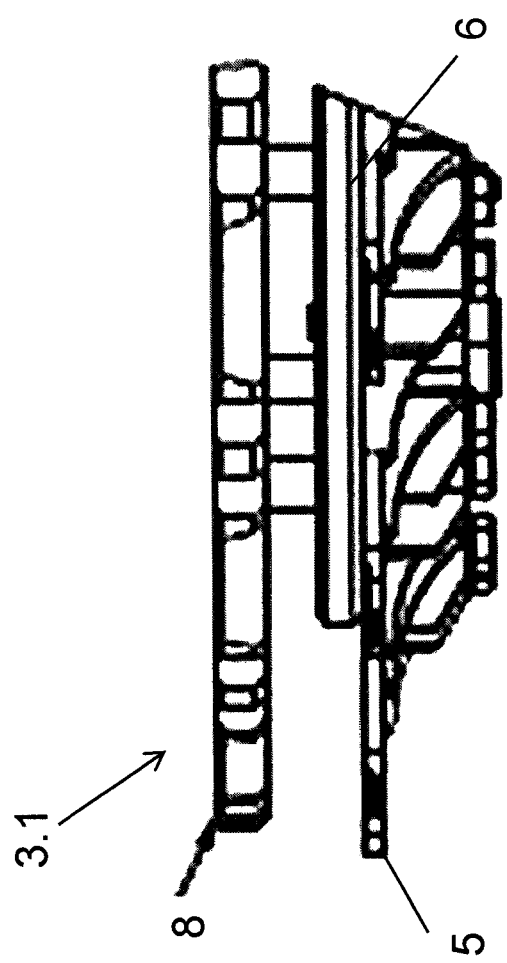

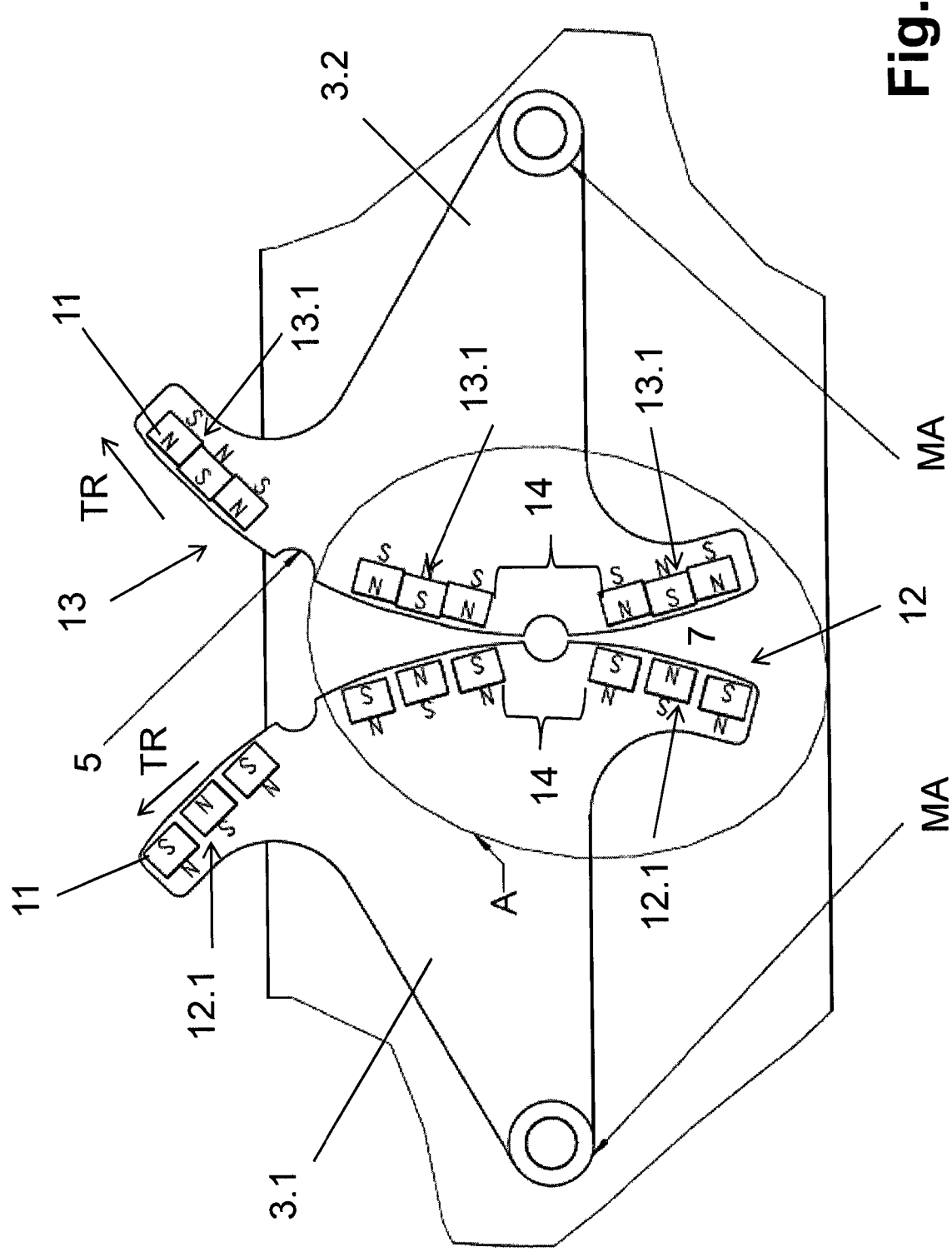

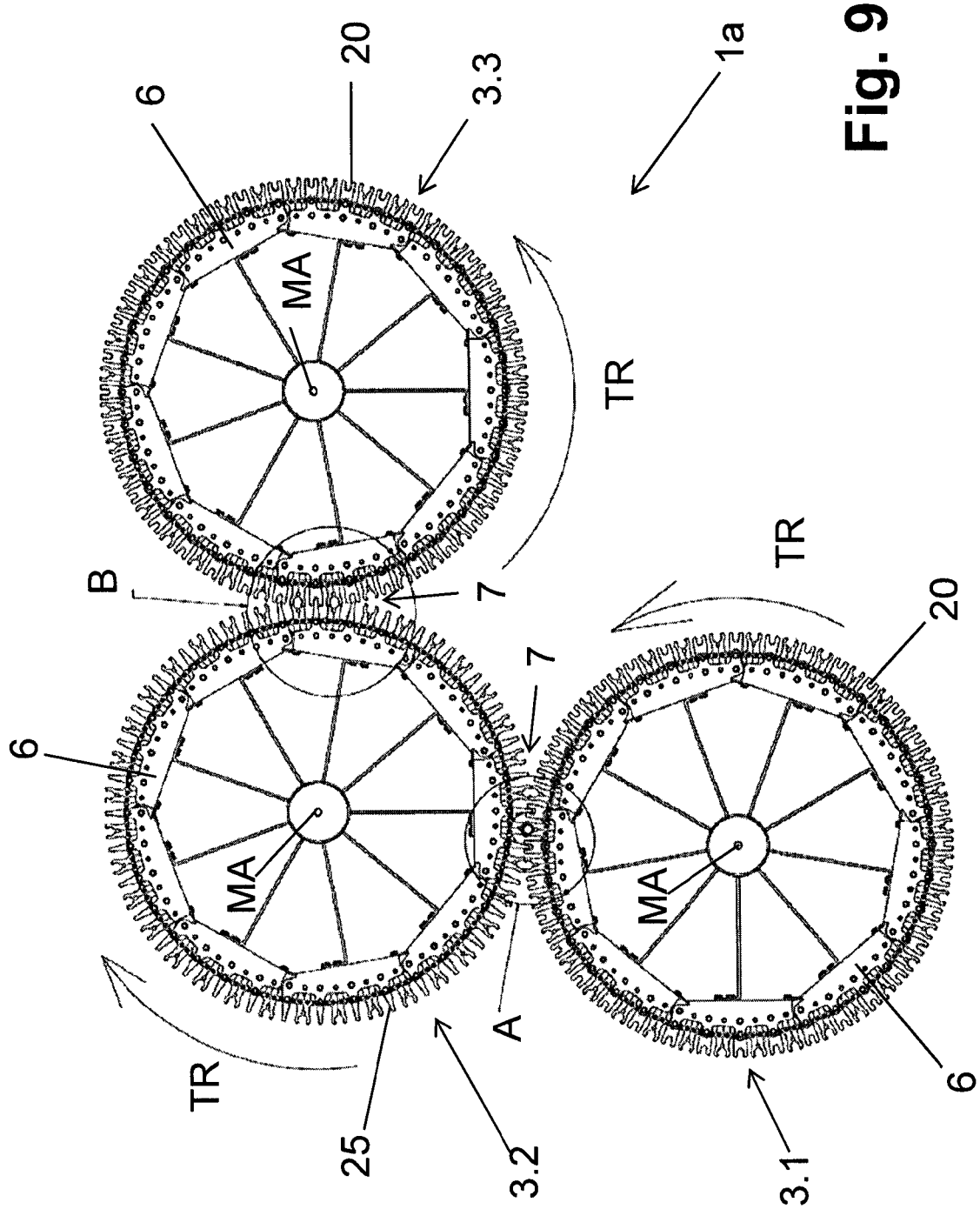

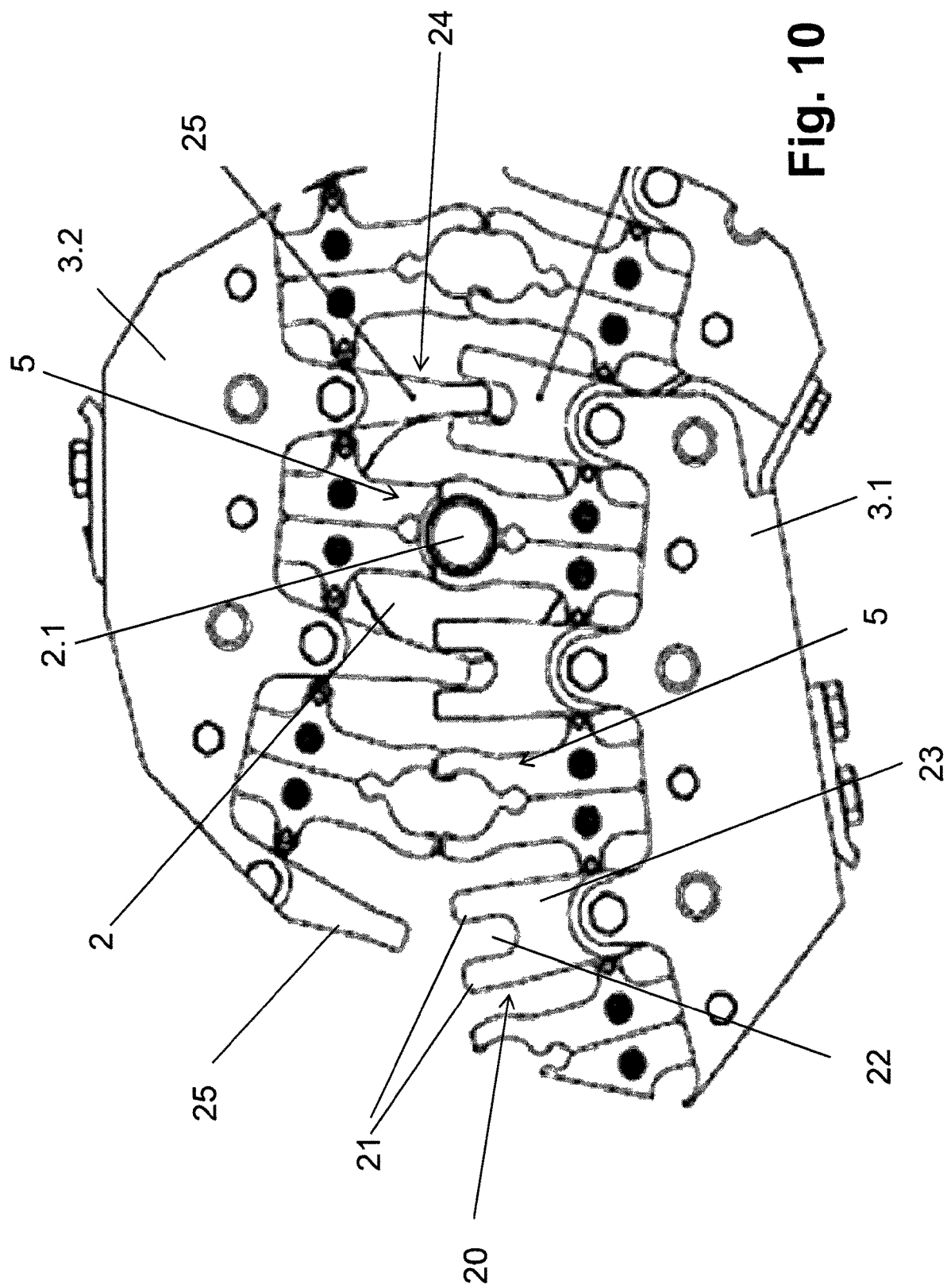

US 10,501,270 B2

DRIVE SYSTEM FOR A CONTAINER CONVEYING SECTION, AND CONTAINER CONVEYING SECTION COMPRISING A DRIVE SYSTEM OF SAID TYPE

RELATED APPLICATIONS

This is the national stage under 35 USC 371 of international application PCT/EP2016/078134, filed on Nov. 18, 2016, which claims the benefit of the Nov. 26, 2015 priority date of German application DE 102015120540.8, the contents of which are herein incorporated by reference.

FIELD OF INVENTION

The invention relates to a drive system for a container conveying section.

BACKGROUND

It is known to convey containers using rotors that have container receptacles at peripheries thereof. These rotors can be arranged to have a point of tangency with each other. Container transfer from one rotor to the next occurs at this point of tangency.

Container transfer between rotors generally requires that the rotors rotate in opposite directions but in synchrony with each other. One way to ensure synchrony is to have a central drive that drives all the rotors together. Another method is to have a separate motor for each rotor and to drive them all in synchrony.

SUMMARY

In one aspect, the invention features a plurality of container conveyors of the rotating type connected to one another in the conveying direction, with the containers positioned so as to define a container-transfer zone at which containers are transferred between the container conveyors. Not all the container conveyors have their own drive. In the simplest case, only one of the container conveyor comprises its own drive while any container conveyors upstream and/or downstream of this driven container conveyor in the transport direction are driven by torque transfer that occurs where the container conveyors are tangent to each other in the container-transfer zone.

In some embodiments, the torque transfer takes place by mechanical engagement of teeth on toothed rims of the conveyors. In other embodiments, torque transfer takes place by interaction of magnetic tooth arrangements.

As used herein, "container conveyors" refer to such structures as transport stars of a container-conveying section driven such as to rotate about a vertical or essentially vertical machine axis, that convey containers between machines or devices of a container treatment system. The term "container conveyor" also includes rotors of container-treatment machines or container-treatment devices that rotate about a vertical or essentially vertical machine axis. Examples of such container-treatment machines or devices include those that clean, sterilize, fill, close, or label containers, either by applying labels or by printing directly on the containers.

As used herein, "containers" refer to cans, bottles, tubes, or pouches, in each case of metal, glass, and/or plastic, as well as other packaging means, in particular those that are suitable for being filled with powdered, granulated, fluid, or viscous products. The drive system is particularly well suited for the driving of container conveying sections on which containers are transported, preferably bottles made of plastic, such as PET, that are characterized by low weight.

Due to the use of only one drive for one of the container conveyors of the container conveying section, as well as a reduction of the effort and expenditure in respect of structural design and control technology, there is in particular also a reduction of the structural volume with the container conveyors, which according to the invention do not have their own drive motors.

The expression "essentially" and "approximately" refer to deviations from an exact value by ±10%, preferably by ±5%, and/or deviations in the form of changes that are not of significance to the function.

All the features described and/or represented as images are in principle the object of the invention, individually or in any desired combination, regardless of their association in the claims or reference to them. The contents of the claims are also made constituent parts of the description.

BRIEF DESCRIPTION OF THE DRAWINGS

The invention is described hereinafter on the basis of the figures in relation to exemplary embodiments. In the figures:

FIG. 3 is a close-up of the rotor's periphery near the container shown in FIG. 1;

FIG. 4 is a close-up of an edge-on view of one of the rotors shown in FIG. 1;

FIG. 6 is close-up view of the container-transfer area that can be seen in FIG. 1 with the container operating in a second operating mode;

FIG. 9 is a view from above three rotors connected to each other at container-transfer areas;

FIG. 10 is a close-up view of detail A from FIG. 9;

DETAILED DESCRIPTION

Figure 1:
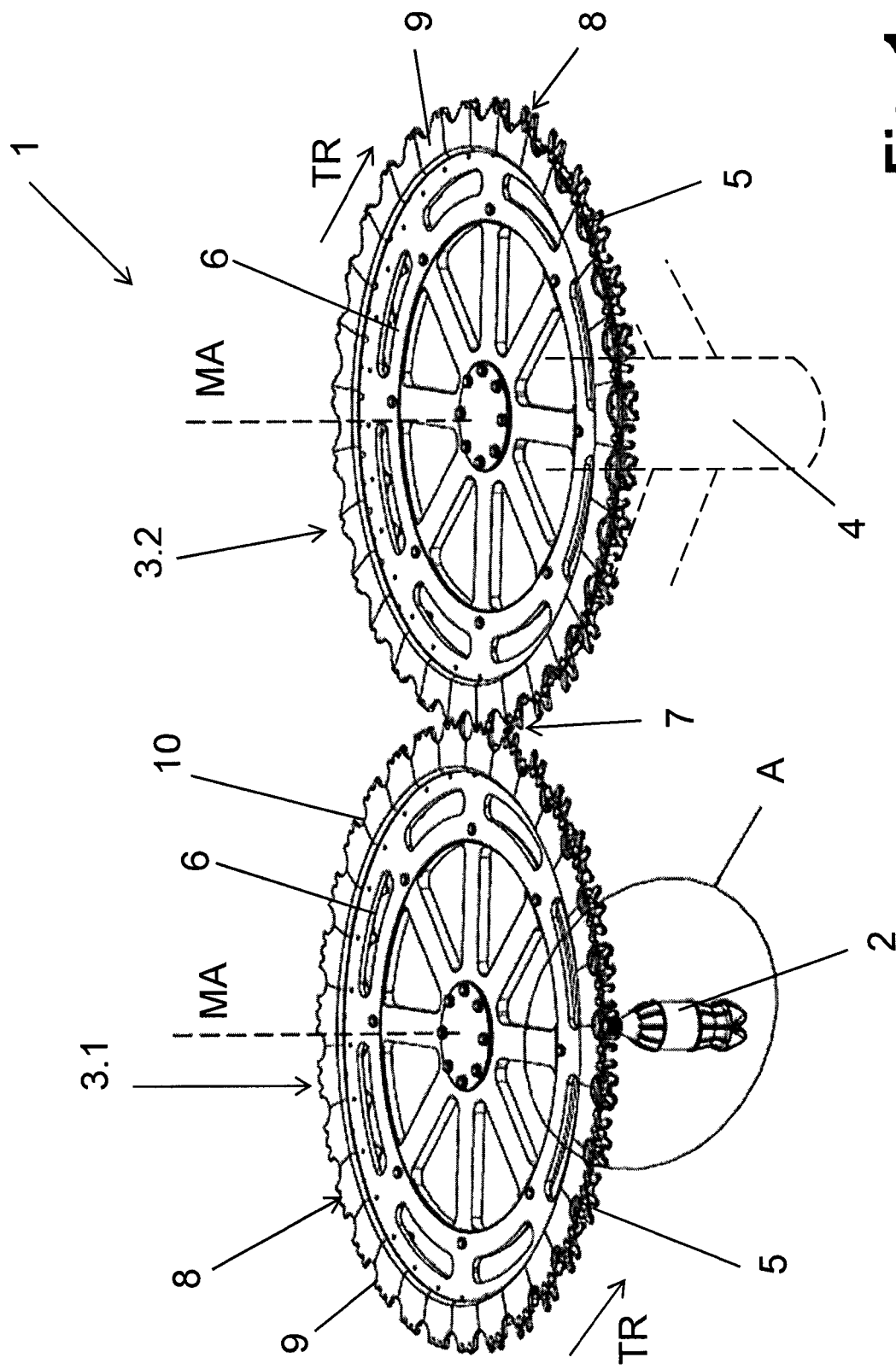
FIG. 1 shows a simplified perspective view from above, of two rotors that meet at a container-transfer area.
Figure 2:
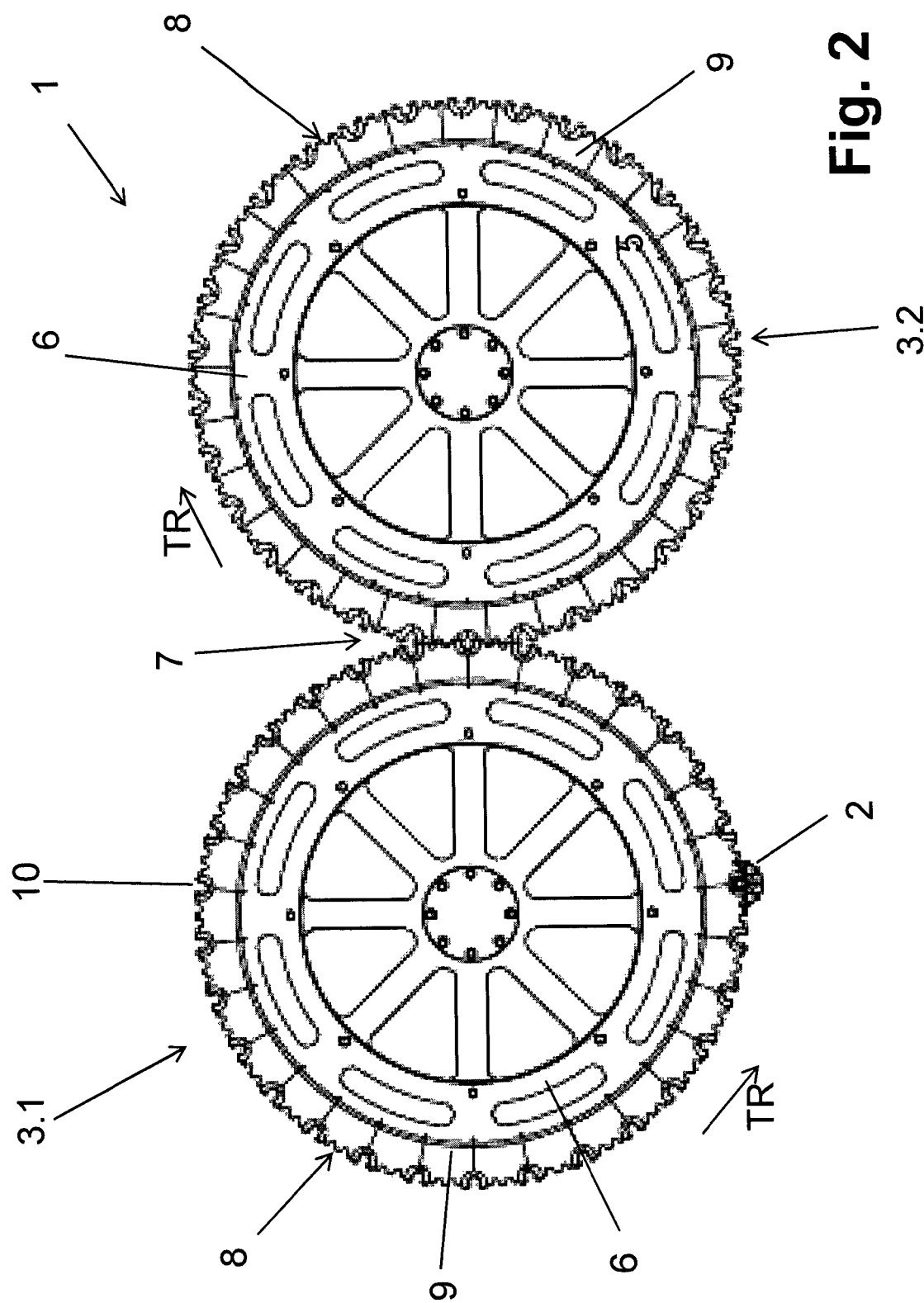
FIG. 2 is a top view of the rotors in FIG. 1.
Figure 5:
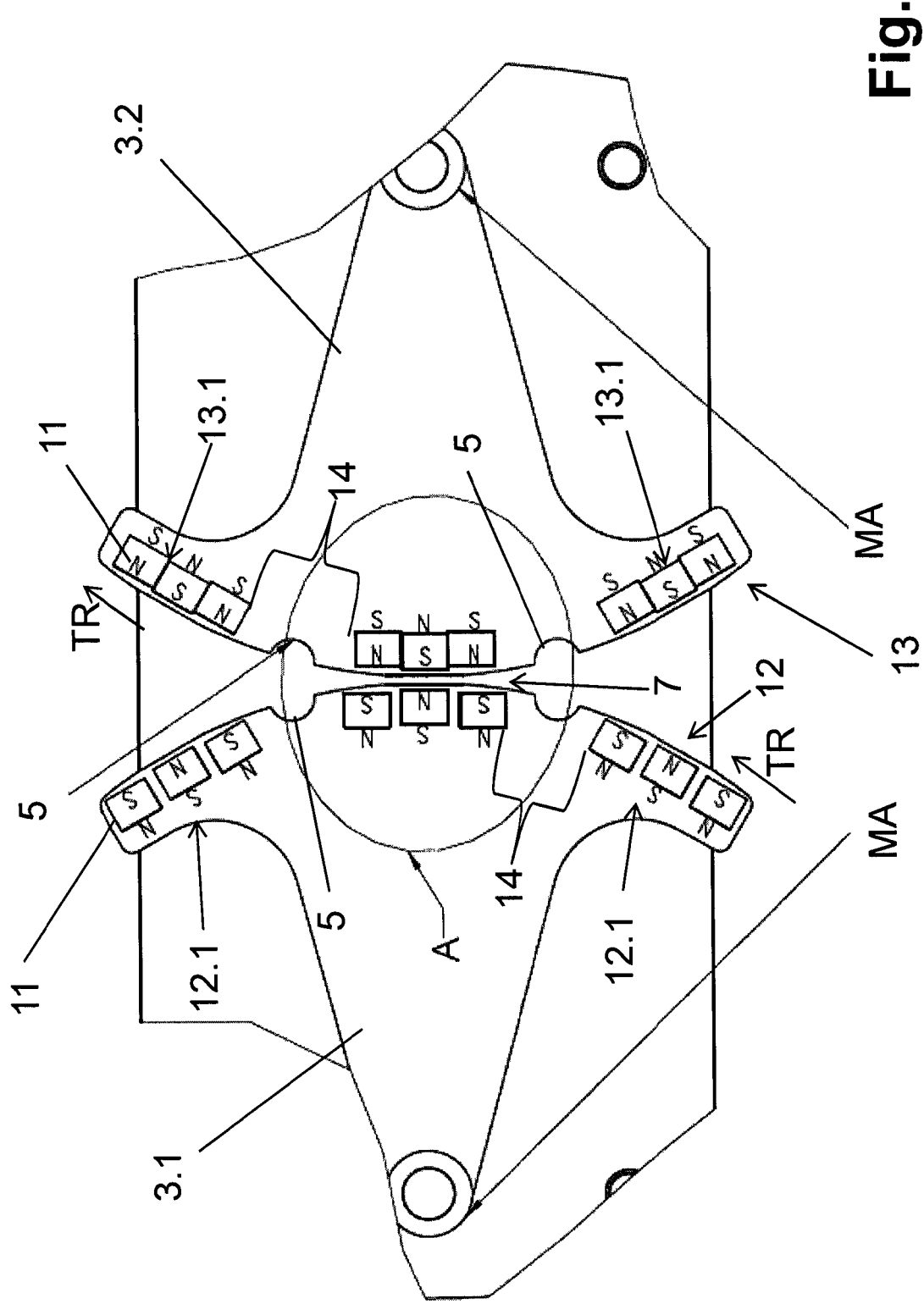
FIG. 5 is close-up view of the container-transfer area that can be seen in FIG. 1 with the container operating in a first operating mode.

FIGS. 1-4 show a container-conveying segment 1 for conveying containers 2 in a conveying direction TR. The containers 2 themselves are typically made of plastic or PET. In the particular embodiment shown, the containers 2 take the form of bottles.

The container-conveying segment 1 includes first and second essentially identical container-conveyors 3.1, 3.2 that are implemented as carrying wheels 6. The first and second container conveyors 3.1, 3.2 mount to their own respective individual machine frames 4 so as to rotate about a vertical machine axis MA and to rotate in a conveying direction TR. In the particular embodiment shown, the second container-conveyor 3.2 follows the first container-conveyor 3.1 in the conveying direction TR.

During the operation of the conveying segment 1, the first and second container-conveyors 3.1, 3.2 rotate synchronously about their respective machine axes MA, but in opposite directions. In the embodiment shown in FIG. 1, the first container-conveyor 3.1 rotates counter-clockwise and the second container conveyor 3.2 rotates clockwise, Since the first and second container-conveyors 3.1, 3.2 are essentially identical, the following description pertains to the first container-conveyor 3.1.

The first container-conveyor 3.1 carries container receivers 5 that are disposed around a circumference thereof at equal angular intervals about the machine axis MA. Suitable container receivers 5 include container clamps or reception apertures that open towards the circumference of the container conveyor 3.1. Each container receiver 5 suspends a container during transport thereof by a flange or neck ring thereof just below the container's opening 2.1.

As a result of the synchronous rotation of the first and second container-conveyors, whenever a container receiver 5 of the first container-conveyor 3.1 brings a container 2 to the container transfer area 7, the second container-conveyor 3.2 will always have a free container receiver 5 to receive it.

Only one container conveyor of the entire container-conveying segment 1 is actually driven, for example by its own electric motor or by being connected to an electric motor. In the illustrated embodiment, only the second container conveyor 3.2 is driven. The driven conveyor drives all the remaining container conveyors, both upstream and downstream, by torque transfer from the driven container conveyor via their carrying wheels 6.

In the embodiment represented in FIGS. 1-4, toothed wheels or toothed rims at the peripheries of the first and second conveyors 3.1, 3.2 form toothed arrangements 8 that transfer the torque from the second container conveyor 3.2 to the first container conveyor 3.1. The toothed arrangements 8 engage each other at the container transfer area 7 in such a way that, at the container transfer area 7, there is always an essentially play-free connection between the first and second container conveyors 3.1, 3.2. This connection arises because, at all times, either a tooth of a tooth arrangement 8 of the first container conveyor 3.1 engages a gap between two teeth of a tooth arrangement 8 on the second container-conveyor 3.2 or vice versa.

As shown in the figures, a plurality of segments 9 form a tooth arrangement 8. Each segment 9 has a radially-facing edge from which teeth extend radially outward. Each segment 9 also has circumferentially facing edges at which it joins adjacent segments. The segments 9 thus extend around the circumference of the carrying wheel 6.

In addition to the segmented embodiment shown, it is also possible for the tooth arrangement 8 to be formed by a single piece that extends all the way around the carrying wheel 6.

The tooth arrangement 8 defines a foot circle centered on the machine axis MA and having a foot-circle radius. The container receivers 5 define a receiver circle, also centered on the machine axis MA. The receiver circle is either a circle defined by container axes of containers held by the container receivers 5 or by some part of the container receiver 5. This receiver circle has a receiver-circle radius that is equal to or essentially equal to the foot-circle radius.

The foot circle defined by the tooth arrangement 8 and the receiver circle are coaxial but offset from each other in the axial direction by a small offset. The offset is preferably less than the height of a container. This offset is also smaller than the axial-movement space required by a container 2 during conveying thereof.

In the embodiment represented, the tooth arrangement 8 is located in each case above the container receivers 5, and also above the container openings 2.1. In this situation, however, each tooth arrangement 8 is cut out in generous dimensions at each container conveyor 5, and therefore at the container opening 2.1, of each container 2 held suspended at a container receiver 5, as is shown in the figures with the cut-out apertures 10 formed in each case at the transition between two segments 9. Despite these cut-out apertures 10, it is still ensured that in every rotational or angle setting of the container conveyors 3.1 and 3.2, the tooth arrangements 8 of the container conveyors 3.1 and 3.2 connecting to one another always reliably mesh with one another and are in engagement. The conveyor transfer area 7 therefore also forms that area at which the torque transfer takes place.

In the embodiment represented, the cut-out apertures 10, open at the circumference of the container conveyors 3.1 and 3.2, are configured in the form of part circles or semicircles, and specifically with a radius which is equal or essentially equal to the distance interval exhibited by the two adjacent teeth of the tooth arrangement 8 from one another. Each cut-out aperture 10 is, in this case, formed by two receivers, which are provided at the transition between the segments 9 and which supplement the respective aperture 10. Preferably, the edge of each aperture 10 is further configured as an oblique surface in such a way that the open area of the tooth arrangement 8 is enlarged above the container opening 2.1 of the respective container 2 held at a container receiver 5. Due to the apertures 10, the possibility is prevented that friction incurred at the meshing of the tooth arrangements 8 passes into the containers 2. This can also be achieved by a cover provided between the respective tooth arrangement 8 and the container receiver 5 and protecting the container apertures 2.1 in relation to the tooth arrangement 8, for example by a ring-shaped cover plate, which is likewise secured to the carrying wheel 6 of the spoked wheel type of the respective container conveyor 3.1 or 3.2 respectively, coaxially with the machine axis MA and, for example, is configured as continuous or segmented.

The apertures 10 can, however, also be configured differently, wherein a main feature is that the apertures 10 exhibit a size which corresponds at least to the diameter of the container neck.

The embodiment described heretofore of the container conveyors 3.1 and 3.2 with the tooth arrangement 8 allows not only for the torque transfer from the container conveyor equipped with a drive, i.e. in the embodiment shown from the container conveyor 3.2, onto a motorless container conveyor, i.e. in the embodiment represented onto the container conveyor 3.1, in a particularly simple manner, but also allows for the space above and below the container conveyors 3.1 and 3.2 to be kept free of any drive-related connections between the container conveyors 3.1 and 3.2 following one another in the conveying direction, and in this situation in particular also allows for the formation of machine elements or machine frames 4, serving to mount the container conveyors 3.1 and 3.2, in the form of a column with a diameter which is perceptibly smaller than that diameter exhibited by the container conveyors 3.1 and 3.2.

Instead of the tooth arrangements 8 in the form of toothed wheels, other machine elements can also be used which allow for a direct and play-free or essentially play-free torque transfer, more precisely the transfer of circumferential force between the container conveyors 3.1 and 3.2, connected to one another in the conveying direction, and specifically in such a way that, by way of this torque or circumferential force transfer, the container conveyors connected to one another in the conveying direction (arrow TR) exhibit an opposed direction of rotation, as is required for the transfer of the containers 2 from one container conveyor 3.1 to the following container conveyor 3.2 at the container transfer area 7.

For better legibility, hereinafter in both the description as well as in the claims, reference is made only to torque transfer or to analogous references, wherein, in the framework of the present Application, this is always understood to mean expressly and more correctly the physical transfer of circumferential forces.

FIGS. 5-8 show, in schematic representation, a torque transfer with the aid of magnets 11, in particular with the aid of permanent magnets, which are provided at the circumference of the container conveyors 3.1 and 3.2, for example above the container conveyors 5. The container conveyors 5 are represented in FIGS. 5-8 in only a very simplified form as being in open apertures at the circumference of the container conveyors 3.1 and 3.2.

The magnets 11 form in term of effect a magnetic tooth arrangement 12 at the container conveyor 3.1 and a magnetic tooth arrangement 13 at the container conveyor 3.2. The magnets 11 of the magnetic tooth arrangements 12 and 13 take effect on one another over a magnet gap which is formed at the respective container transfer area 7 or at a torque transfer region located there, in a manner described in greater detail hereinafter, for the transfer of the torque from the container conveyor comprising the drive motor, for example from the container conveyor 3.2, to the container conveyor which does not comprise a drive motor, for example onto the container conveyor 3.1. The container transfer region 7 in turn forms that area at which the torque transfer takes place.

For the purpose of simpler representation, it is assumed in FIGS. 5-8 that this magnet gap is formed at the circumference of the container conveyors 3.1 and 3.2, and extends radially or essentially radially to the machine axes MA.

The magnets 11 of each magnetic tooth arrangement 12 and 13 are in each case arranged in groups 12.1 (magnetic tooth arrangement 12) or in groups 13.1 (magnetic tooth arrangement 13), wherein these groups 12.1 and 13.1 comprise in each case, for example, the same number of magnets 11, i.e. in the embodiment represented, in each case three magnets 11. The magnets 11 in each group 12.1 and 13.1 are, moreover, configured and arranged in such a way that the groups 12.1 and 13.1 comprise in each case a pole sequence on their side which forms the magnet gap at the container transfer area 7, i.e. for example at the circumference of the container conveyors 3.1 or 3.2 respectively, in the rotation or conveying direction (arrows TR), in which the polarity of the magnets 11 changes from magnet to magnet. The magnets 11 in the pole sequence of the groups 12.1 are in this case opposed to the magnets 11 in the pole sequence of the groups 13.1. With this group 12.1, therefore, the first magnet 11, related to the rotation or conveying direction (arrow TR), is arranged with a first polarity, the next magnet 11 following, with a second polarity opposed to the first, and the next magnet 11 following is again arranged with the first polarity on the side forming the magnet gap, e.g. at the circumference of the container conveyor 3.1. With each group 13.1, conversely, the first magnet 11, related to the rotation or conveying direction (arrow TR), is arranged with the second polarity, the next magnet 11 following with the first polarity, and the next magnet 11 following in turn with the second polarity on the side forming the magnet gap, e.g. at the circumference of the container conveyor 3.1. In this situation, for example, the first polarity is the south pole S and the second polarity is the north pole N.

It is understood that the number of the magnets 11 in the groups 12.1 and 13.1 can diverge from three, wherein, however, the sequence of the alternating different poles of the magnets 11 on the sides forming the magnet gap of the groups 12.1 and 13.1, i.e. in the embodiment represented, at the circumference of the respective container conveyors 3.1 and 3.2. The division distance interval between the groups 12.1, i.e. the distance interval which the groups 12.1 exhibit between one another, is the same as the distance interval between the groups 13.1. The number of the groups 12.1 and 13.1 is preferably identical at the container conveyors 3.1 and 3.2.

The arrangement is further such that, between the individual groups 12.1 following one another in the conveying direction (arrow TR), and likewise between the groups 13.1 following one another in the conveying direction (arrow TR), an intermediate space or interruption 14 is formed, at which in each case a container receiver 5 is located. Moreover, the poles of the magnets 11 in the groups 12.1, in the rotation or conveying direction, exhibit a greater mutual distance interval from one another than the poles of the magnets 11 of the groups 13.1, i.e. in the embodiment shown the magnets 11 in the groups 13.1 are provided in each case immediately connected to one another, while the magnets 11 of the groups 12.1 exhibit a mutual distance interval a, as can be clearly identified in FIG. 7.

Figure 8:
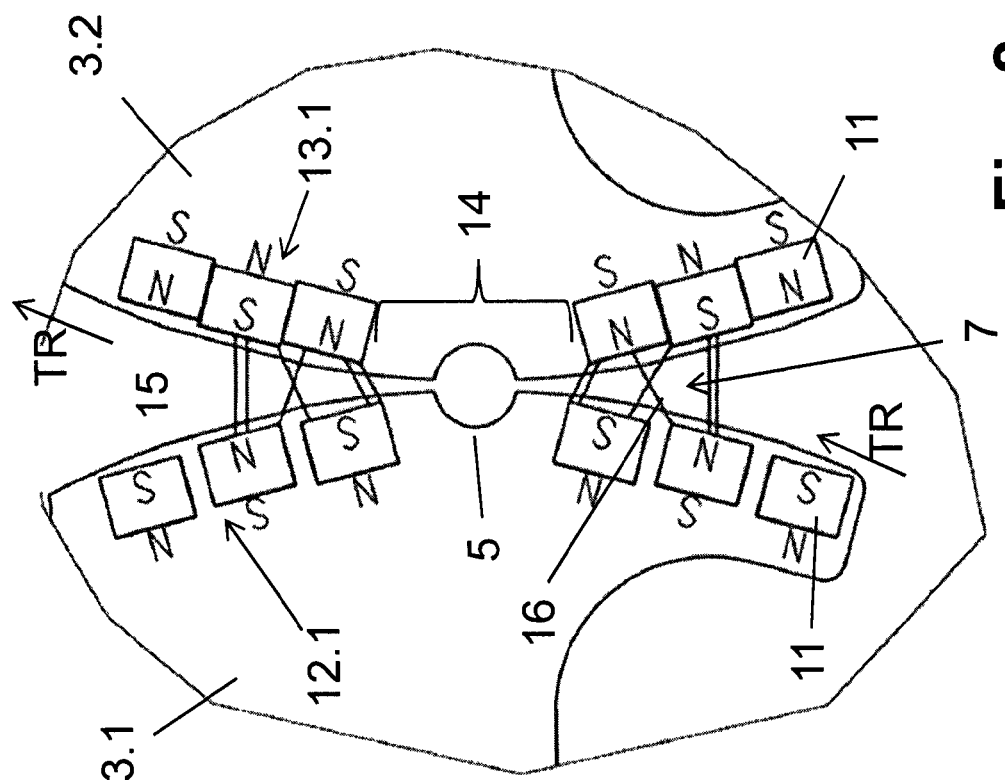
FIG. 8 is a close-up view of detail A from FIG. 6.
Figure 7:
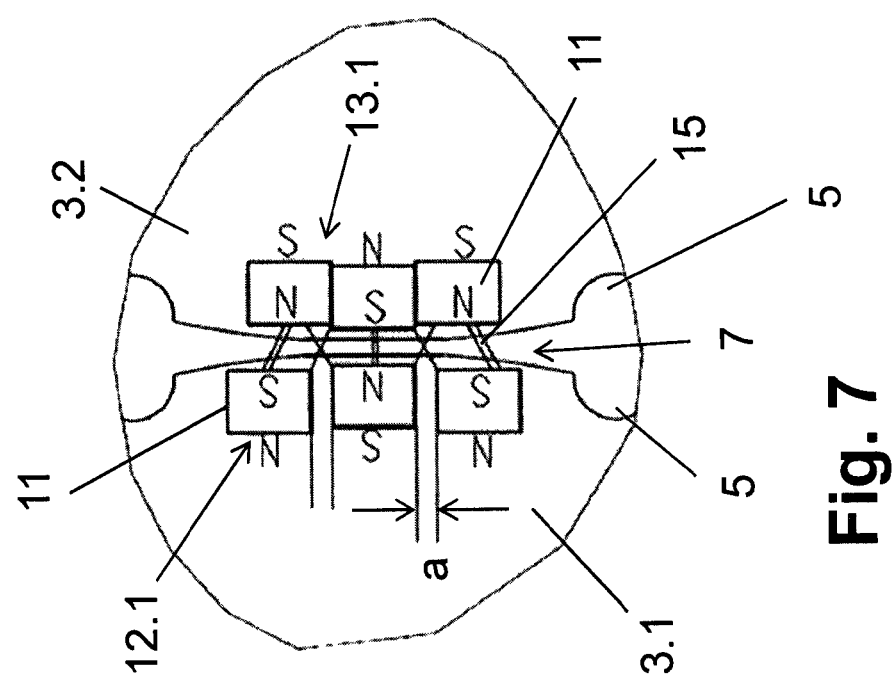
FIG. 7 is a close-up view of detail A from FIG. 5.

As FIGS. 7 and 8 show in particular, at each moment in time, and in each rotational position of the container conveyor 3.2 driven such as to circulate, a plurality of magnets 11 of the magnetic tooth arrangement 13 interact with magnets 11 of opposite polarity of the magnetic tooth arrangement 12. This is indicated in FIGS. 7 and 8 by the double lines 15, such that, by means of the magnetic forces taking effect between the magnets 11, a torque transfer takes place from the container conveyor 3.2 onto the container conveyor 3.1, i.e. the latter is moved conjointly with the container conveyor 3.2, and specifically in a direction of rotation opposed to the direction of rotation of the container conveyor 3.2. Moreover, due to the different distance interval between the poles of the magnets 11 in the groups 12.1 and 13.1, repelling magnetic forces are attained between the magnetic toothed arrangements 12 and 13, as is indicated by the single lines 16 in FIGS. 7 and 8. These repelling magnetic forces are, as a rule, smaller than the magnetic forces which have the effect of the torque transfer (double lines 15). The repelling magnetic forces (single lines 16), however, cause an increased "rigidity" of the torque transfer, i.e. a reduction of the residual elasticity of the drive, which is inevitable with purely magnetic torque transfer.

An advantage of the magnetic torque transfer is, among others, that no friction occurs between the interacting magnetic tooth arrangements 12 and 13. In particular, if the magnetic tooth arrangements 12 and 13, or the magnetic gap formed between these tooth arrangements, are located beneath the container apertures 2.1 of the containers 2 arranged at the receivers 5, then it is possible to do without the cover protecting the container openings 2.1.

Figure 11:
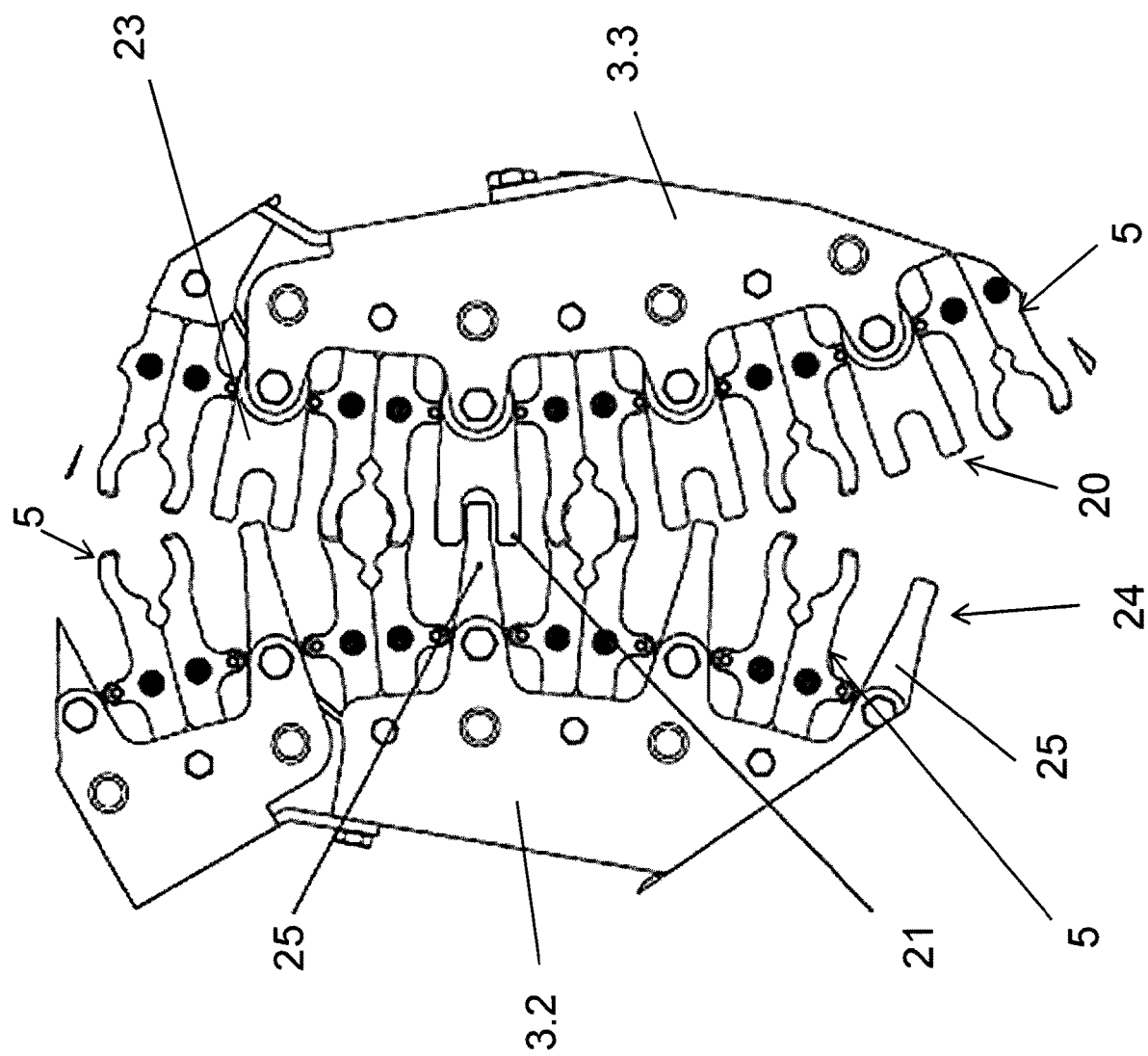
FIG. 11 is a close-up view of detail B from FIG. 9.

FIGS. 9-12 relate to a container conveying segment 1*a*, which comprises three container conveyors 3.1, 3.2, and 3.3, connected to one another in the conveying direction (arrows TR) in each case at a container transfer area 7 (detailed representations of FIGS. 10 and 11). Each container conveyor comprises in turn a carrying wheel 6 mounted on a machine frame 4 and capable of rotating about a vertical machine axis MA, at the circumference of which are formed the container receivers 5 for a suspended holding of the containers 2, preferably in the form of bottles, at their neck rings.

Figure 12:
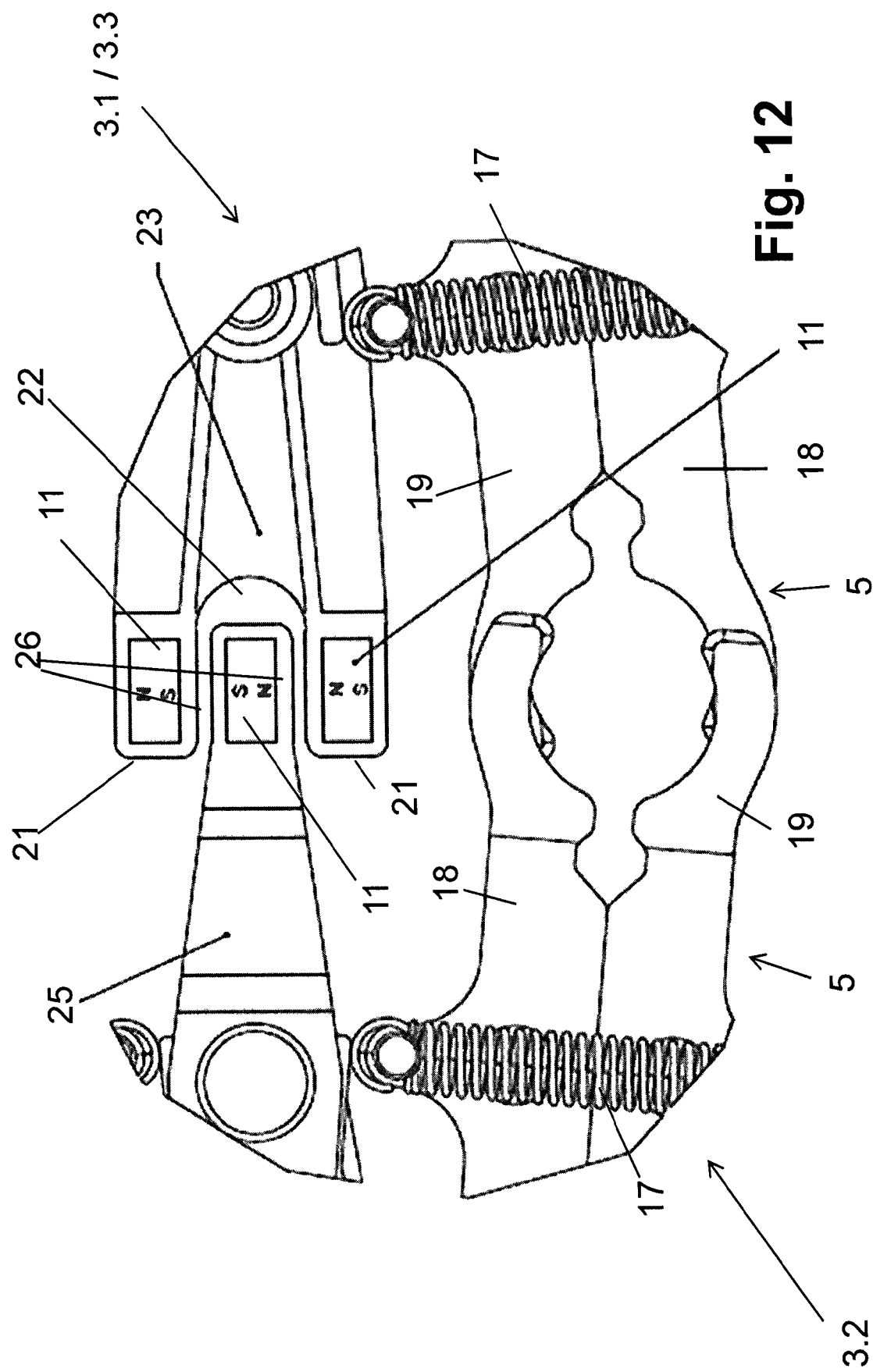
FIG. 12 is close-up view of a connection region between the rotors in FIG. 9.

As FIG. 12 shows by way of example, the container receivers 5 are configured, in the manner known to the person skilled in the art, in the form of clamps or grippers, in each case configured with gripper arms 18 and 19, pretensioned by a spring 17, which in its closed position holds in clamp fashion the respective container 2, in the form of a bottle, at the bottle neck. The container receivers, with their carrier arms 18 and 19, and the associated springs 17, are in each case provided as complete structural units at the circumference of the carrying wheel 6 concerned, such that the container conveyors 5 project radially over the circumferential surface of the carrying wheel 6.

With the container conveying segment 1a, again, only one of the container conveyors, for example the container conveyor 3.2, comprises its own electrical drive, while the other container conveyors, i.e. for example the container conveyor 3.3, upstream of the container conveyor 3.2 in the conveying direction (arrows TR) and downstream of the container conveyor 3.2 in the conveying direction (arrows TR) does not comprise its own drive motor, but is driven at the respective container transfer area 7 by the torque transfer formed there by the container conveyor which does comprise the drive motor, for example by the container conveyor 3.2.

It is self-explanatory that provision can also be made with other embodiments of the present invention such that, if a plurality of container conveyors are available, not only one but also two or more, but not all, of these container conveyors can be equipped with their own electrical drives, such that at least one container conveyor is configured without its own drive, and is driven or moved by means of the magnetic torque transfer presented according to the invention.

In the final analysis, the torque transfer is in turn produced on the container conveying segment 1a by magnetic force. For this purpose, with two container conveyors connected to one another in the conveying direction (arrows TR), one of these conveyors, i.e. in the embodiment represented the container conveyors 3.1 and 3.3, are in each case provided at their circumference with a type of tooth arrangement 20 which comprises a plurality of teeth 21, arranged in each case in pairs, wherein in each case a gap 22 is formed in each case between the teeth 21 of each of these pairs of teeth.

Each pair of teeth, with the two teeth 21 and the gap 22 formed between these teeth, is secured as a plate 23 at the circumference of the carrying wheel 6 concerned in such a way that it projects with its teeth 21 radially to the machine axis MA over the circumference of the carrying wheel 6 concerned. As FIGS. 10 and 11 show in particular, the tooth arrangement 20 is interrupted in such a way that, seen in a view from above onto the container conveyors 3.1 and 3.3, a container receiver 5 is located between two teeth pairs or plates 23, and specifically at the same division distance interval between the plates 23 adjacent to the gaps 22, wherein this division distance also corresponds to half the distance interval of two gaps 22 of the tooth arrangement 21 following one another in the rotation direction of the container conveyor 3.1 and 3.5 respectively.

It is not absolutely necessary, however, for the division distance interval also to correspond to half the distance interval between two gaps 22 of the tooth arrangement 21, following one another in the rotation direction of the container conveyor 3.1 and 3.3 respectively. In cases in which the container receivers exhibit a greater distance interval from one another, it is also possible for a plurality of teeth 21 and/or gaps 22 to be arranged between two container receivers.

The other container conveyor connecting to the container transfer area 7, i.e. in the embodiment represented, the container conveyor 3.2, comprises a tooth arrangement 24 which is formed from a plurality of finger-like teeth 25, projecting from the circumference of the carrying wheel 6 concerned, of which the mutual division spacing interval corresponds to the division spacing interval of the gaps 22 of the tooth arrangement 20, such that, at the respective container transfer area 7, which is also the torque transfer area, at every point of time and at every rotational position of the container conveyors 3.1-3.3, at least one tooth 25 engages in each case into a gap 22. The number of the teeth 25 is preferably the same as the number of gaps 22. In a view from above onto the container conveyor concerned, namely onto the container conveyor 3.2, provided between two teeth 25 following one another in the circumferential direction is in each case is a container receiver 5, and specifically, in the embodiment represented, at the same division distance interval from two adjacent teeth 25. The two tooth arrangements 20 and 24, which are located, for example, on a level beneath the container openings 2.1, in the embodiment represented are not tooth arrangements in which the torque transfer takes place mechanically, in that the teeth 25 are in contact against the flanks of the teeth 21. Rather, the torque transfer takes place by magnetic forces which take effect essentially in the circumferential direction of the container conveyors 3.1-3.3 between the teeth 21 and 25. For this purpose, permanent magnets 11 are provided at the teeth 21 and 25, and specifically in such a way that the permanent magnet 11 of each tooth engaging in a gap 22 faces with its poles towards a permanent magnet 11, provided in each case at a tooth 21, which exhibits the same polarity, i.e. the south pole S of the permanent magnet 11 of the tooth 25 faces towards the south pole S of the permanent magnet 11 of the 11 at a tooth 21 forming the gap 22, and the north pole N of the permanent magnet 11 of the tooth 25 faces the north pole N of the permanent magnet 11 at the other tooth 21 forming the gap 22, as is also represented in FIG. 12. As a result, repelling magnetic forces are incurred between the two tooth arrangements 20 and 24 and their teeth 21 and 25, and in each case taking effect essentially tangentially to the direction of rotation of the container conveyors 3.1, 3.2, and 3.3. In order for a torque transfer to take place between the tooth arrangements 20 and 24 without the teeth 21 and 25 coming in contact, instead a gap or magnetic gap 26 remains between each tooth 25 engaging in a gap 22 and the teeth 21, as a result of which, in particular, any mechanical friction is avoided during the interacting of the tooth arrangements 20 and 24 or during the torque transfer.

With the container conveying segment 1 and 1a comprising the magnetic tooth arrangements 12 and 13 or 20 and 24 respectively, it likewise applies that, due to the arrangement of the magnetic tooth arrangements 12 and 13 or 20 and 24, in immediate proximity to the receivers 5, i.e. at a distance interval from the receivers 5 which is smaller than the height of the containers 2, and therefore also smaller than the dimension which the movement space of the containers 2 exhibits in the axial direction parallel to the machine axis MA, the machine frame 4 for mounting the container conveyor 3.1-3.3 can be configured in the form of a column, with a diameter substantially reduced in relation to the container conveyor, and an easily accessible space is provided beneath the container conveyors 3.1-3.3 which is readily accessible for cleaning, maintenance, and repair purposes.

The invention has been described heretofore on the basis of exemplary embodiments. It is understood that numerous modifications and derivations are possible. It has been assumed heretofore, for example, that the container conveyors 3.1-3.3 are conveyor stars of the container conveying segment 1. In principle, however, at least one of the container conveyors 3.1-3.3 can be the circulating conveyor element (rotor) of a container treatment machine or of a container handling device, for example of a machine or device for the cleaning, sterilising, or filling, or of a device or a machine for equipping containers, for example for labelling or printing of containers, etc. This conveying element of the machine or the device concerned is in this case then likewise, in the final analysis, a constituent part of a container conveying segment, namely a part of the container conveying segment on which the containers are moved through the machine.

It has been assumed heretofore that the container conveyors 3.1-3.3 are configured for suspended receiving of containers 2 at the container receivers 5. In principle, there is also the possibility that at least one container conveyor is configured in such a way that the containers 2 are held there standing with their bases on at least one container standing surface and/or are otherwise held at the container conveyor.

It has been assumed heretofore that the carrying wheels 6 are centrally mounted. This is not essential, however. It is likewise possible for the carrying wheels 6 to be configured in ring fashion and to be mounted at their circumferences, as a result of which, for example, a greater freedom is provided for the configuration of the interior structural space.

The invention claimed is:

1. An apparatus comprising a container-conveying segment comprising a drive, a driving conveyor, and a driven conveyor, wherein said driving conveyor comprises a driving-conveyor rotor that rotates about a driving-conveyor machine-axis and said driven conveyor comprises a driven-conveyor rotor that rotates about a driven-conveyor machine-axis, wherein said driven-conveyor machine-axis is vertical, wherein said driving-conveyor machine-axis is vertical, wherein said driving-conveyor comprises driving-conveyor container-receivers for holding and conveying containers in a conveying direction, wherein said driven-conveyor comprises driven-conveyor container-receivers for holding and conveying containers in a conveying direction, wherein said driving and driven conveyors interact with each other at a handoff area at which a container is transferred between said driven conveyor and said driving conveyor, wherein said driving-conveyor rotor and said driven-conveyor rotor rotate in opposite directions, wherein said drive drives said driving conveyor, wherein said driving conveyor drives said driven conveyor by torque transfer, and wherein said torque transfer occurs at a torque-transfer area, wherein said torque-transfer area comprises said handoff area.

2. The apparatus of claim 1, wherein said driving conveyor comprises a driving-conveyor tooth arrangement along a circumference thereof and said driven conveyor comprise a driven-conveyor tooth arrangement along a circumference thereof and wherein said torque transfer results from interaction between said driven-conveyor tooth arrangement and said driving-conveyor tooth arrangement.

3. The apparatus of claim 1, wherein said torque transfer results from interaction between a driven-conveyor tooth arrangement and a driving-conveyor tooth arrangement that are on respective circumferences of said driven conveyor and said driving conveyor, wherein said driving-conveyor tooth arrangement is radially offset from said driving-conveyor container-receivers, and wherein said driven-conveyor tooth arrangement is radially offset from said driven-conveyor container-receivers.

4. The apparatus of claim 1, further comprising a driving-conveyor tooth arrangement formed on a rim of a toothed wheel on said driving conveyor and a driven-conveyor tooth arrangement formed on a rim of a toothed wheel on said driven conveyor, wherein said torque transfer results from interaction between said driven-conveyor tooth arrangement and said driving-conveyor tooth arrangement.

5. The apparatus of claim 1, further comprising first magnets that are oriented to expose alternating magnetic poles and second magnets that are oriented to expose alternating magnetic poles, wherein torque transfer results from an interaction that results when said first and second magnets expose opposite poles to each other across said gap, wherein said first magnets are on a driving-conveyor tooth arrangement that extends along a circumference of said driving conveyor, and wherein said second magnets are on a driven-conveyor tooth arrangement that extends along a circumference of said driven conveyor.

6. The apparatus of claim 1, wherein said driving-conveyor tooth arrangement comprises a first magnet, wherein said driven-conveyor tooth arrangement comprises a second magnet and a third magnet, wherein a first pole of said first magnet faces a pole of the same polarity of said second magnet across a first gap, wherein a second pole of said first magnet faces a pole of the same polarity of said third magnet across a second gap, wherein, as a result, repulsive magnetic force acts tangentially so as to cause torque transfer.

7. The apparatus of claim 1, further comprising magnets, wherein a first one of said driving tooth arrangements comprises teeth arranged in pairs, wherein each pair of teeth defines a gap therebetween, wherein a second one of said driving tooth arrangements comprises a tooth that is inserted into said gap when said tooth and said gap are in said torque transfer area, wherein said tooth comprises one of said magnets and said teeth comprise others of said magnets, wherein said magnets are oriented to cause a magnetic force that is tangential to said tooth arrangements.

8. An apparatus comprising a container-conveying segment comprising a drive, a driving conveyor, and a driven conveyor, wherein said driving conveyor comprises a driving-conveyor rotor that rotates about a driving-conveyor machine-axis and said driven conveyor comprises a driven-conveyor rotor that rotates about a driven-conveyor machine-axis, wherein said driven-conveyor machine-axis is vertical, wherein said driving-conveyor machine-axis is vertical, wherein said driving-conveyor comprises driving-conveyor container-receivers for holding and conveying containers in a conveying direction, wherein said driven-conveyor comprises driven-conveyor container-receivers for holding and conveying containers in a conveying direction, wherein said driving and driven conveyors interact with each other at a handoff area at which a container is transferred between said driven conveyor and said driving conveyor, wherein said driving-conveyor rotor and said driven-conveyor rotor rotate in opposite directions, wherein said drive drives said driving conveyor, wherein said driving conveyor drives said driven conveyor by torque transfer, and wherein said torque transfer occurs at a torque-transfer area, wherein said driving conveyor and said driven conveyor are conveyor stars, one of which is a rotor of a container-treatment machine and the other one of which either transfers a container into said container-treatment machine or receives a container from said container-treatment machine.

9. The apparatus of claim 8, wherein said driving-conveyor container-receivers and said driven-conveyor container-receivers are coplanar on a plane that is perpendicular to said driving-conveyor machine-axis and to said driven-conveyor machine-axis, wherein said driving conveyor comprises a driving-conveyor tooth arrangement along a circumference thereof and said driven conveyor comprise a driven-conveyor tooth arrangement along a circumference thereof and wherein said torque transfer results from interaction between said driven-conveyor tooth arrangement and said driving-conveyor tooth arrangement, wherein said driving-conveyor tooth arrangement and said driven-conveyor tooth arrangement are vertically offset from said plane.

10. The apparatus of claim 8, wherein said driving conveyor comprises a driving-conveyor tooth arrangement along a circumference thereof, wherein said driven conveyor comprises a driven-conveyor tooth arrangement along a circumference thereof, wherein said torque transfer results from interaction between said driven-conveyor tooth arrangement and said driving-conveyor tooth arrangement, wherein driving-conveyor tooth arrangement and said driven-conveyor tooth arrangement comprise cut-outs.

11. The apparatus of claim 8, further comprising first and second magnets, wherein torque transfer results from interaction of aid first and second magnets across a gap, wherein said first magnets are on a driving-conveyor tooth arrangement that extends along a circumference of said driving conveyor, and wherein said second magnets are on a driven-conveyor tooth arrangement that extends along a circumference of said driven conveyor.

12. The apparatus of claim 8, wherein said driving-conveyor tooth arrangement comprises a first magnet, wherein said driven-conveyor tooth arrangement comprises second magnets, and wherein torque transfer results from a magnetic force caused by repulsion of said first magnet and said second magnets, wherein each pole of said first magnet faces a pole of the same polarity of said second magnets, wherein said magnetic force acts tangentially, thereby causing torque transfer.

13. The apparatus of claim 8, wherein said driving-conveyor tooth arrangement comprises a first magnet, wherein said driven-conveyor tooth arrangement comprises a second magnet and a third magnet, wherein a first pole of said first magnet faces a pole of the same polarity of said second magnet across a first gap, wherein a second pole of said first magnet faces a pole of the same polarity of said third magnet across a second gap, wherein, as a result, repulsive magnetic force acts tangentially so as to cause torque transfer, wherein said first magnet is disposed on a first tooth, wherein said second magnet is on a first cusp of a bicuspid tooth, wherein said third magnet is on a second cusp of said bicuspid tooth, wherein said first and second cusps define a gap therebetween, and wherein said first tooth is inserted into said gap during torque transfer.

14. The apparatus of claim 8, wherein said driven conveyor comprises driven-conveyor teeth and said driving conveyor comprises driving-conveyor teeth, wherein said driven-conveyor teeth and said driving-conveyor teeth engage each other with no mechanical contact between them.

15. An apparatus comprising a container-conveying segment comprising a drive, a driving conveyor, and a driven conveyor, wherein said driving conveyor comprises a driving-conveyor rotor that rotates about a driving-conveyor machine-axis and said driven conveyor comprises a driven-conveyor rotor that rotates about a driven-conveyor machine-axis, wherein said driven-conveyor machine-axis is vertical, wherein said driving-conveyor machine-axis is vertical, wherein said driving-conveyor comprises driving-conveyor container-receivers for holding and conveying containers in a conveying direction, wherein said driven-conveyor comprises driven-conveyor container-receivers for holding and conveying containers in a conveying direction, wherein said driving and driven conveyors interact with each other at a handoff area at which a container is transferred between said driven conveyor and said driving conveyor, wherein said driving-conveyor rotor and said driven-conveyor rotor rotate in opposite directions, wherein said drive drives said driving conveyor, wherein said driving conveyor drives said driven conveyor by torque transfer, and wherein said torque transfer occurs at a torque-transfer area, wherein first magnets are configured as successive first groups of magnets and second magnets are configured as successive second groups of magnets, and wherein when said first and second groups are arranged such that when said first group faces said second group across said gap, corresponding magnets in said first and second groups expose opposite poles to each other.

16. The apparatus of claim 15, further comprising interruptions between each pair of successive groups in said first group, wherein said interruptions are said interruptions are at said container receivers.

17. The apparatus of claim 15, wherein magnets within a third group are adjacent to each other and magnets in a group other than said third group are not adjacent from each other, wherein said third group is selected from the group consisting of said first group and said second group.

18. The apparatus of claim 15, wherein said container receivers are configured to suspend containers.

19. The apparatus of claim 15, wherein said torque-transfer area comprises said handoff area.

20. The apparatus of claim 15, wherein said driving conveyor and said driven conveyor are conveyor stars, one of which is a rotor of a container-treatment machine and the other one of which either transfers a container into said container-treatment machine or receives a container from said container-treatment machine.

* * * * *